United States Patent [19]

Kirkwood

[11] Patent Number: 4,783,931
[45] Date of Patent: Nov. 15, 1988

[54] GLASS RUN CHANNEL

[75] Inventor: John A. Kirkwood, Edwardstown, Australia

[73] Assignee: Bridgestone Australia Ltd., Edwardstown, Australia

[21] Appl. No.: 35,601

[22] Filed: Apr. 7, 1987

[30] Foreign Application Priority Data

Apr. 7, 1986 [AU] Australia .............................. PH5355
Sep. 9, 1986 [AU] Australia .............................. PH7902

[51] Int. Cl.⁴ .............................................. E06B 7/23
[52] U.S. Cl. ......................................... 49/441; 49/491
[58] Field of Search ........................ 49/441, 440, 491

[56] References Cited

U.S. PATENT DOCUMENTS

| 3,258,876 | 7/1966 | Deisenroth et al. | 49/441 |
| 3,479,768 | 11/1969 | Smadja | 49/441 |
| 4,007,536 | 2/1977 | Soderberg | 49/491 X |
| 4,470,223 | 9/1984 | Mesnel | 49/441 |
| 4,477,507 | 10/1984 | Kunert | 49/491 X |
| 4,530,186 | 7/1985 | Guillon | 49/441 |
| 4,572,872 | 2/1986 | Yamazaki et al. | 49/441 X |
| 4,610,907 | 9/1986 | Elvira | 49/441 X |

Primary Examiner—Philip C. Kannan
Attorney, Agent, or Firm—Henry Sternberg; Bert J. Lewen

[57] ABSTRACT

With the object of providing a glass run channel which can accommodate the curvature in both front elevation and plan, and also some degree of twisting, in this invention a glass run channel comprises a metal core of general S shape, the metal core having a continuous unbroken strip and a plurality of transversely extending slits forming between them bars or ribs extending transversely from the unbroken strip, the core being covered with an elastomer.

7 Claims, 2 Drawing Sheets

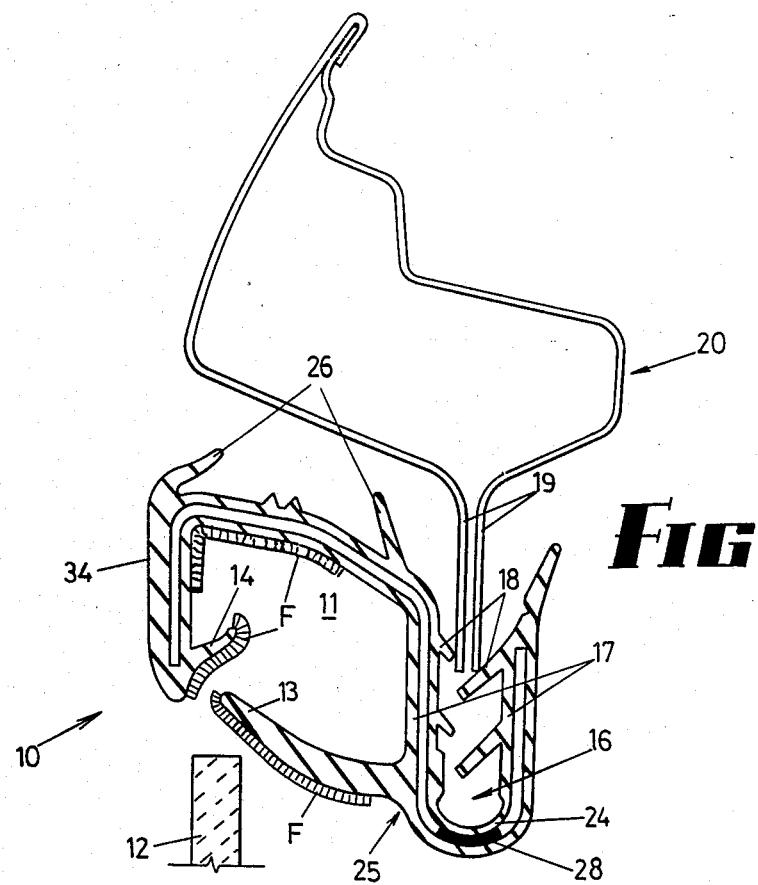
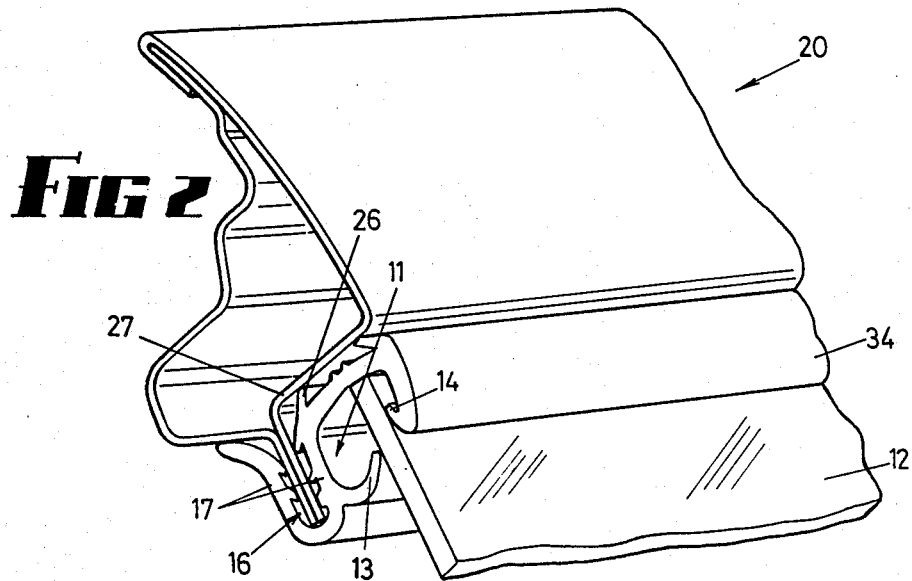

GLASS RUN CHANNEL

This invention relates to a vehicle glass run channel of the type which is generally S shape, and is used for guiding the vehicle side window panes in their movement within the frame of a door of a motor vehicle.

BACKGROUND OF THE INVENTION

Some motor vehicle doors comprise inner and outer panels having inwardly turned flanges which abut one another and are spot welded together.

There is also a requirement for the panes of glass to be as close as possible to the outer skin of the vehicle ("flush mounting"), for several reasons including aesthetics, and reduction of wind noise, and reduction of coefficient of vehicle drag.

Consequently, there has been an adaptation of previously used S section mouldings, wherein the mouth of one of the recesses engages over the spot welded flanges and the mouth of the other recess is provided with glass engaging lips which will guide and cushion the glass. The prior art includes the British Application No. A2118232 (Draftex), British Patent No. 1355303 (Porsche), British Patent No. 1356871 (Ford), U.S. Pat. No. 4,007,536 (Soderberg), U.S. Pat. No. 3,479,768 (Smadja), U.S. Pat. No. 2,933,342 (Bright) and the Australian Application No. 31892/84 (Schlegel). Most of the prior art referred to includes a metal membrane of some type which will stiffen the glass run channel, and for example the Soderberg U.S. Pat. No. 4,007,536 makes use of a spring steel core layer, the Australian Schlegel application No. 31892/84 utilises a wire carrier as its metal membrane, the Smadja U.S. Pat. No. 3,479,768 refers to a "corrosion proof metal strip with its surface partly cut out" and the strip is coated by extrusion with a suitable thickness of synthetic rubber or plastic. Smadja is the closest art known to the applicant. Bright U.S. Pat. No. 2,933,342 also discloses a window guide constructed from a blank of sheet metal bent into a channel shape, the blank being formed with a series of inwardly directed slots to assist in bending curved about a small radius.

It is known that in the motor industry, attempts have been made to utilise imperforate strips of steel and aluminium, but a difficulty is encountered if imperforate strips are used as the core of a glass run channel, in that the doors usually have a radius in the x-y plane (elevation), a radius in the x-z plane (plan) and also a twist. It is thus necessary not merely to bend the metal around a small radius but also to twist the metal core of the channel. If aluminium is used which is sufficiently soft to achieve this, then there is a possibility of deformation occurring inadvertently, and a consequential damage to the product which is difficult to correct. If wire, or wire retained strips are used, as in some instances then a difficulty is encountered in maintaining sufficient structural integrity (that is, stiffness and shape).

A product known as "pinch weld" is widely used in the automotive trade, and this product comprises a metal core which is formed as a "lanced-stretch section", that is, the metal core is lanced with a plurality of slits extending transversely but the slits do not extend for the full width of the section, and the imperforate part of the section is subsequently rolled to extend its length and open the slits up into slots. The core is then formed to a U shape, and is covered with a PVC or other polymeric material, but is so worked that the thin imperforate longitudinal portions are all snapped and the "pinch weld" then consists of discontinuous transversely extending metal bars or ribs which hold the cross-sectional shape of the product. However this technique is not suitable for use with a glass run channel, because it is necessary for the metal core to be continuous in order to retain sufficient structural rigidity and strength.

BRIEF SUMMARY OF THE INVENTION

With the object of providing a glass run channel which can accommodate the curvature in both front elevation and plan, and also some degree of twisting, in an embodiment of this invention a glass run channel comprises a metal core of general S shape, the metal core having a continuous unbroken strip and a plurality of transversely extending slits forming between them a plurality of bars or ribs extending transversely from the unbroken strip, the core being covered with an elastomer. In some embodiments there are a plurality of longitudinal strips.

More specifically, the invention consists of a motor vehicle glass run channel having a general S shape, and comprising a metal core covered with an elastomer outer casing, the core having a continuous unbroken strip extending longitudinally, and a plurality of bars extending transversely from the strip and spaced by slots, the cross-section including a relatively small channel portion and a relatively large channel portion, said small channel portion having inwardly directed resilient barbs and said large channel portion having inwardly directed resilient lips, said barbs and lips being of said elastomer.

For any one cross-sectional shape of glass run channel, there are a plurality of longitudinally extending bends, and by selecting the locality of a bend, and, in some instances, either the locality of a second bend or an edge, for the imperforate longitudinally extending strip portions, it is possible to obtain a structurally sound core which however can be bent either in an x-y plane (elevation), an x-z plane (plan), or can be twisted, or any combination of the three. The material used can however be sufficiently stiff and rigid that it will resist inadvertent deformation (such as may occur with soft aluminium) and the cost can be relatively small.

The invention further extends to a method of production, the method of production including the steps of performing a metal core to the shape defined above, extruding an elastomeric material around the metal core, curing the eleastomeric material, applying adhesive to glass engaging portions of the elastomeric material and applying a flock material to the adhesive, and cutting to a length. In some instances the method may still further include bending the work piece around a segmented table by retaining the work piece in close contact with the segments of the table, the segmented table being provided with three articulated portions capable of sufficient articulation to bend the glass run channel about two small radii, as well as the segments which allow bending the glass run channel about large radii.

BRIEF DESCRIPTION OF THE DRAWINGS

Two embodiments of the invention are described hereunder in some detail with reference to, and are illustrated in, the accompanying drawings, in which:

FIG. 1 is an enlarged cross-sectional view of a first embodiment, showing a glass run channel, and also illustrating a vehicle door frame and a side window pane;

FIG. 2 is a fragmentary perspective showing the door frame and window pane engaged by the channel;

DETAILED DESCRIPTION OF THE PREFERRED EMBODIMENT

Figure 3:
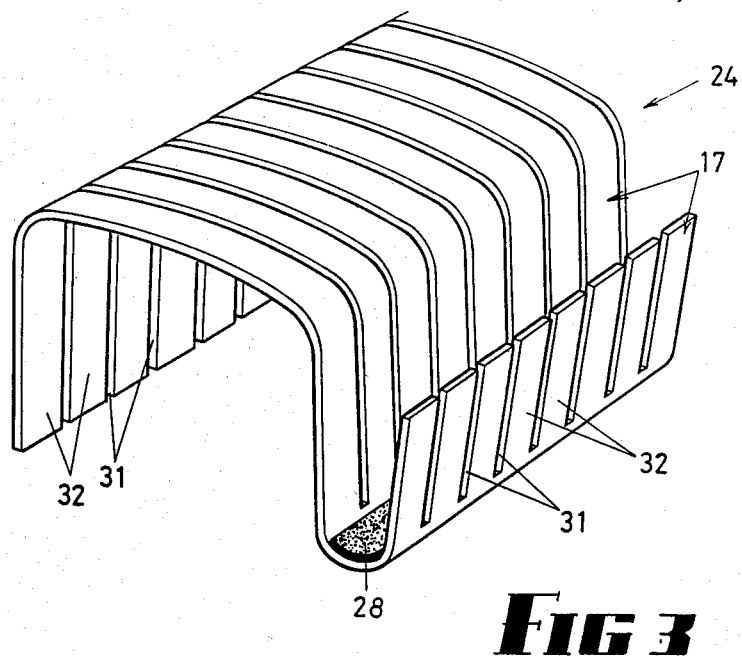
FIG. 3 is a fragmentary perspective view of the metal core.

All the drawings herein are to an enlarged scale.

Referring first to FIG. 1, a glass run channel 10 is of general S shape, having a relatively large channel portion 11 which accepts a pane of glass 12 between resilient inner and outer lips 13 and 14, which become deflected as the glass 12 enters the channel portion 11 as shown in FIG. 2.

The relatively small channel portion 16 has two parallel limbs 17 (which must remain parallel) and each limb 17 has resilient barbs 18 projecting into the channel portion 16, and these barbs 18 firmly engage the spot welded flanges 19 which join the inner and outer panels of a door frame 20.

The glass run channel 10 comprises a core 24 (carrier) of metal which is described hereunder more particularly with reference to FIG. 3, and this has adhered to it and extruded around it an outer casing 25 of EPDM rubber, of which the lips 13 and 14 and barbs 18 form portion. There are also provided "weather proofing" lips 26 which bear against the web 27 of the door frame 20 (FIG. 2). The areas marked F are flocked electrostatically with polyester flock over an adhesive material which is first applied and subsequently cured. This flocking reduces the friction against the glass as the glass 12 enters the large channel portion 11.

The greatest difficulty encountered is to retain sufficient structural stiffness and strength of the product while also being able to twist the product, and bend the product simultaneously in both elevation and plan (x-y and x-z planes).

As can be seen from FIG. 3, the portion marked 28 is a longitudinal unbroken portion of the core 24, this being a portion between the limbs 17 which flank the small channel 16, and applicants have established this being the most suitable area for the location of the imperforate longitudinal web. FIG. 3 illustrates the preferred pattern of slots 31 and the unbroken strip 28 of the core 24, the slots 31 being formed initially by a simple lancing operation which forms the transversely extending slits, which can (but need not necessarily) be expanded into slots by rolling the strip 28, the unbroken strip 28 being of sufficient width that upon bending there is no breakage or fracture such as would separate the bars 32 between the slots 31.

Sometimes however it is desirable that the outermost flange of the large channel portion 34 (which is readily visible) should have a minimum of shrink marks, and this can be achieved by grinding and, if necessary, applying a light coating of polymeric paint. It can also be assisted if a second unbroken strip extends along the outer edge of the core.

(1) A steel strip is performed by lancing, the lanced slits extending transversely but being discontinuous to at least one unbroken strip 28. If the metal strip which is used has not previously been treated with a bonding agent, it is necessary to do so either before or after the lancing operation. The strip 28 (or strips) is then subjected to a rolling operation so that the slits open up into the slots 31, but there is retained sufficient width of unbroken strip 28 to avoid inadvertent fracture. The elongate strip is then rollformed to a partly "folded" cross-sectional shape.

(2) Rubber is then extruded around the core 24 generally to the cross-sectional shape shown in FIG. 1, the rubber being an EPDM rubber. The flange 34 is ground to remove shrink marks, and a further "veneer" of rubber is then applied, to provide a better weathering characteristic.

(3) The rubber is cured in an oven through which the glass run channel is passed.

(4) A Polyester flock material F is then passed through an electrostatic field and is adhered to adhesive applied to the outer surfaces of the lips 13 and 14.

(5) The final cross-sectional shape (as illustrated) is then achieved by passing the channel through the rollers which close in the side legs and achieve the cross-sectional shape shown in FIG. 1.

(6) The channel is then cut to length.

(7) The cut length work piece is then bent sharply at the localities of the corners of the door frame to which it is to be fitted, and is bent generally to the curved shape required in a simple segmented bender, utilising simple tools. The bending is in the x-y plane only, the other bending being achieved by hand.

Figure 4:
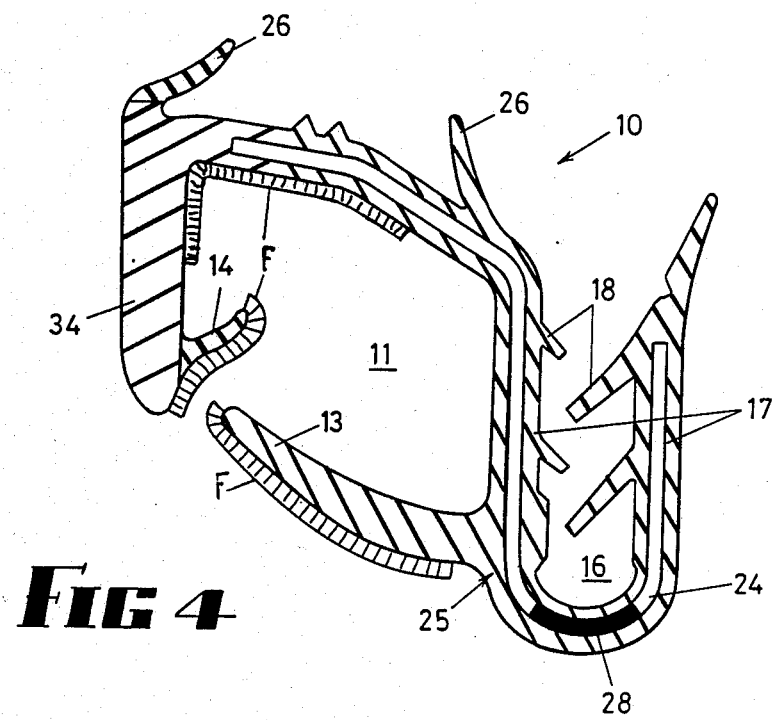
FIG. 4 is a cross-sectional view of a second embodiment wherein the metal core does not extend to the outer flange of the channels.

In some instances it is deemed desirable to avoid the grinding and painting steps, and in the embodiment of FIG. 4, similar parts bear similar designation numbers, but instead of the carrier core 24 being carried into the outermost flange 34, it terminates short of that flange and the outermost flange 34 is extruded separately but simultaneously with the remainder of the extrusion, but of rubber which is much harder and tougher. In this embodiment, the rubber of flange 34 is a firm dense rubber having a hardness much greater than the hardness of the remainder of the weather strip, in this embodiment being about 45 Shore D. Such rubber is so strong that it avoids the need for the support of the metal core, and the rubber will function as a glass run channel support member with a minimum of deflection, such that the rubber surface effectively is a continuation of the door frame surface without any grinding, and consequently without the need for subsequent painting. The remainder of the glass run channel is provided with a much softer rubber, usually in the order of 70-75 Shore a hardness.

The claims defining the invention are as follows.

I claim:

1. A motor vehicle glass run channel having a generally S-shaped cross-section, comprising a metal core covered with an elastomer outer casing,
    said cross-section defining a relatively small channel portion and a relatively large channel portion, said small channel portion having inwardly directed resilient barbs and said large channel portion having inwardly directed resilient lips, said barbs and lips being of elastomer,
    said core including a continuous unbroken strip extending longitudinally, and a plurality of bars extending transversely from the strip and spaced by slots, and said unbroken strip lying between limbs which flank said small channel portion.

2. A motor vehicle glass run channel according to claim 1 wherein the transversely extending bars of the core extend into the limbs which flank the small channel portion and also into an outermost flange of the large claimed portion.

3. A motor vehicle glass run channel according to claim 2 wherein the outermost surface of the outermost flange is a surface which has been ground and painted.

4. A motor vehicle glass run channel according to claim 1 wherein each of the inwardly directed resilient lips has a glass engaging surface of flock material.

5. A motor vehicle glass run channel according to claim 1 wherein the transverse bars of the core extend into the limbs which flank the small channel portion but not into an outermost flange of large channel portion, said outermost flange being of harder elastomer than the remainder of the outer casing.

6. A motor vehicle glass run channel according to any one of claims 2, 4, 3, 5 or 1 wherein said elastomer is EPDM rubber.

7. A motor vehicle glass run channel comprising:

a metal core covered with an elastomer outer casing of a generally S-shaped cross-section said glass run channel being shaped such that said cross-section thereof defines a relatively small channel portion and a relatively large channel portion, said large channel portion opening in direction generally opposite to said small channel portion and each said channel portion having a bottom wall portion extending between limbs thereof, said small channel portion having inwardly directed resilient barbs and said large channel portion having inwardly directed resilient lips, said barbs and lips being of elastomer, said core including a continuous unbroken strip extending longitudinally, and a plurality of bars extending transversely from the strip and spaced by slots, and said unbroken strip lying in the region of said bottom wall portion of said small channel portion.

* * * * *